United States Patent
Segev et al.

(10) Patent No.: US 12,333,156 B2
(45) Date of Patent: Jun. 17, 2025

(54) WRITE AGGREGATION BASED ON NAND WEAR LEVEL

(71) Applicant: Western Digital Technologies, Inc., San Jose, CA (US)

(72) Inventors: Amir Segev, Meiter (IL); Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 39 days.

(21) Appl. No.: 18/447,806

(22) Filed: Aug. 10, 2023

(65) Prior Publication Data

US 2025/0053311 A1    Feb. 13, 2025

(51) Int. Cl.
*G06F 12/00* (2006.01)
*G06F 3/06* (2006.01)

(52) U.S. Cl.
CPC .......... *G06F 3/0619* (2013.01); *G06F 3/0616* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,151,036 B2 | 4/2012 | Yasufuku | |
| 9,529,707 B2 | 12/2016 | Nakamura et al. | |
| 10,643,707 B2 | 5/2020 | Rajamani et al. | |
| 2012/0221767 A1 | 8/2012 | Post et al. | |
| 2017/0083444 A1 | 3/2017 | Dev et al. | |
| 2018/0196768 A1* | 7/2018 | Okita | G06F 3/0688 |
| 2019/0121730 A1 | 4/2019 | Palmer | |
| 2019/0324670 A1 | 10/2019 | Lee | |
| 2020/0110707 A1 | 4/2020 | Wei et al. | |
| 2022/0075722 A1 | 3/2022 | Liang et al. | |

OTHER PUBLICATIONS

International Search Report and Written Opinioin for Application No. PCT/US2024/030976 dated Sep. 9, 2024.
Yan Liu et al., "A Group-Based Buffer Management for SSD" Journal of Circuits, Systems, and Computers vol. 28, No. 12 (2019) 1950213 (21 pages).

* cited by examiner

*Primary Examiner* — Daniel D Tsui
(74) *Attorney, Agent, or Firm* — PATTERSON + SHERIDAN, LLP (57) ABSTRACT

Instead of using programmable block size aggregation, a lower multiple of page, and down to a page size aggregation is used. A bad block prediction unit in a controller is able to predict when a programmable block has a bad page. The bad block prediction unit can lower the aggregation size of a programmable block by monitoring the life cycle of the programmable block through bad block statistic collection. When the accumulation size passes a threshold, the bad block prediction unit lowers the aggregation size. The bad block prediction unit can also predict when to lower aggregation size based on the number of reconstructions. An aggregate size level is set at a page boundary, and once the number of reconstructions reaches that page boundary, the bad block prediction unit lowers the aggregation size to page aggregation. The bad block prediction unit is able to predict both life cycle threshold changes and reconstructions changes.

20 Claims, 10 Drawing Sheets

WRITE AGGREGATION BASED ON NAND WEAR LEVEL

BACKGROUND OF THE DISCLOSURE

Field of the Disclosure

Embodiments of the present disclosure generally relate to improving logic for lowering programmable block aggregation size.

Description of the Related Art

A NAND die consists of many programmable blocks, each block comprised of pages that contain flash memory units (FMU). Each programmable block has an operating number of pages that will be considered full functioning. Through the use of the NAND, there comes a time when at least one programmable block has a failed or worn page.

When a programmable block encounters this issue, either the programmable block stop working or continues to attempt to work as normal. In many cases, the controller logic will attempt to keep with the idea of having all full functioning pages. In this case, the controller works over time to compensate for the lack of a working page which leads to performance degradation and lack of quality of service (QOS) of the NAND.

In the previous approach, a worn page inside a block would cause a "floating" page. Merging, the floating page with a fully functioning page, solving the problem of bad block would cause the system to use increased logic to place the floating page in a programmable block for use by the controller. The previous solution to the issue causes performance degradation.

Therefore there is a need in the art for improving programmable block aggregation.

SUMMARY OF THE DISCLOSURE

Instead of using programmable block size aggregation, a lower multiple of page, and down to a page size aggregation is used. A bad block prediction unit in a controller is able to predict when a programmable block has a bad page. The bad block prediction unit can lower the aggregation size of a programmable block by monitoring the life cycle of the programmable block through bad block statistic collection. When the accumulation size passes a threshold, the bad block prediction unit lowers the aggregation size. The bad block prediction unit can also predict when to lower aggregation size based on the number of reconstructions. An aggregate size level is set at a page boundary, and once the number of reconstructions reaches that page boundary, the bad block prediction unit lowers the aggregation size to page aggregation. The bad block prediction unit is able to predict both life cycle threshold changes and reconstructions changes.

In one embodiment, a data storage device comprises: a memory device; and a controller coupled to the memory device, wherein the controller is configured to: aggregate first data for writing the first data to the memory device, wherein the aggregating first data is for a first aggregation size; change the first aggregation size to a second aggregation size, wherein the first aggregation size is different than the second aggregation size; and aggregate second data for writing the second data to the memory device, wherein the aggregating second data is for the second aggregation size.

In another embodiment, a data storage device comprises: a memory device; and a controller coupled to the memory device, wherein the controller is configured to: aggregate first data for writing the first data to the memory device, wherein the aggregating first data is for a first aggregation size; track a lifetime of the memory device; dynamically change the first aggregation size to a second aggregation size based upon the tracked lifetime, wherein the first aggregation size is larger than the second aggregation size; and aggregate second data for writing the second data to the memory device, wherein the aggregating second data is for the second aggregation size.

In another embodiment, a data storage device comprises: means for storing data; and a controller coupled to the means for storing data, wherein the controller is configured to: track a number of reconstructions that occur due to bad blocks in the means for storing data; predict when a number of reconstructions will exceed a predetermined threshold; and switch an aggregation size of data to be aggregated based upon the prediction.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of using programmable block size aggregation, a lower multiple of page, and down to a page size aggregation is used. A bad block prediction unit in a controller is able to predict when a programmable block has a bad page. The bad block prediction unit can lower the aggregation size of a programmable block by monitoring the life cycle of the programmable block through bad block statistic collection. When the accumulation size passes a threshold, the bad block prediction unit lowers the aggregation size. The bad block prediction unit can also predict when to lower aggregation size based on the number of reconstructions. An aggregate size level is set at a page boundary, and once the number of reconstructions reaches that page boundary, the bad block prediction unit lowers the aggregation size to page aggregation. The bad block prediction unit is able to predict both life cycle threshold changes and reconstructions changes.

Figure 1:
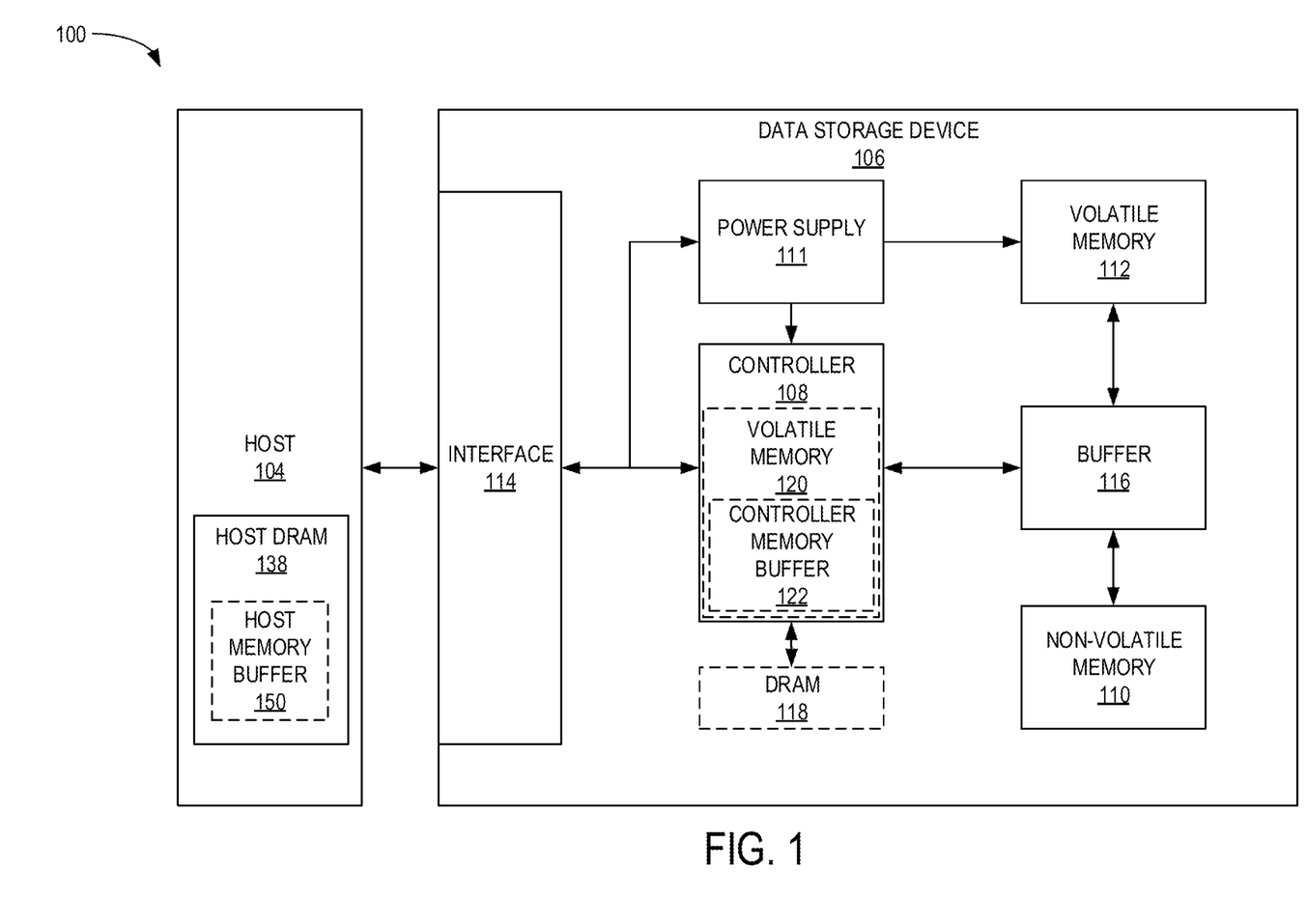
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices. The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
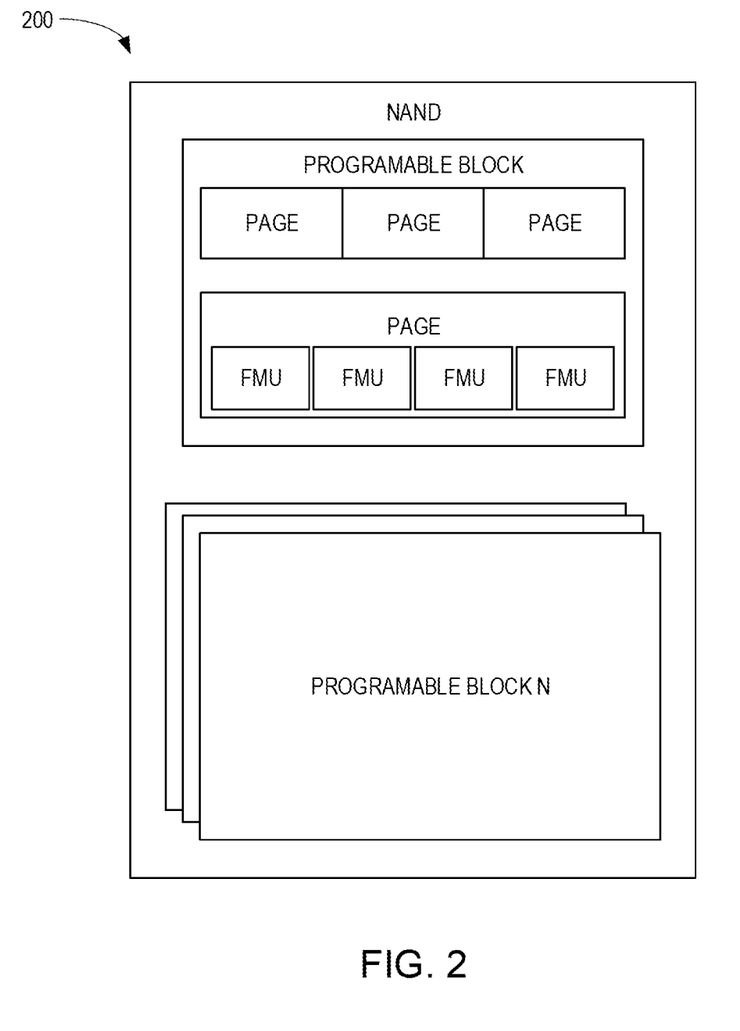
FIG. 2 is a schematic diagram illustrating a full functioning NAND, according to certain embodiments.

FIG. 2 is a schematic diagram illustrating a full functioning NAND 200, according to certain embodiments. The full functioning NAND 200 consists of at least one programmable block. The programmable block consists of four pages. Each of the four pages consists of four flash memory units (FMU)'s. Each of the FMUs contains 4K worth of user data. To be able to write to the NAND 200, a controller such as the controller 108 of FIG. 1 needs to write data to an internal cache. Once the data is written to the internal cache, then the data has to be programed to the NVM such as the NVM 110 of FIG. 1. The programing granularity is done in the programmable block granularity which is 64K in this example. It is to be understood that though the full functioning NAND contains four pages other full functioning NANDs may have more or less pages. Additionally, while 5 programmable blocks are shown, more or less programmable blocks are contemplated.

Figure 3:
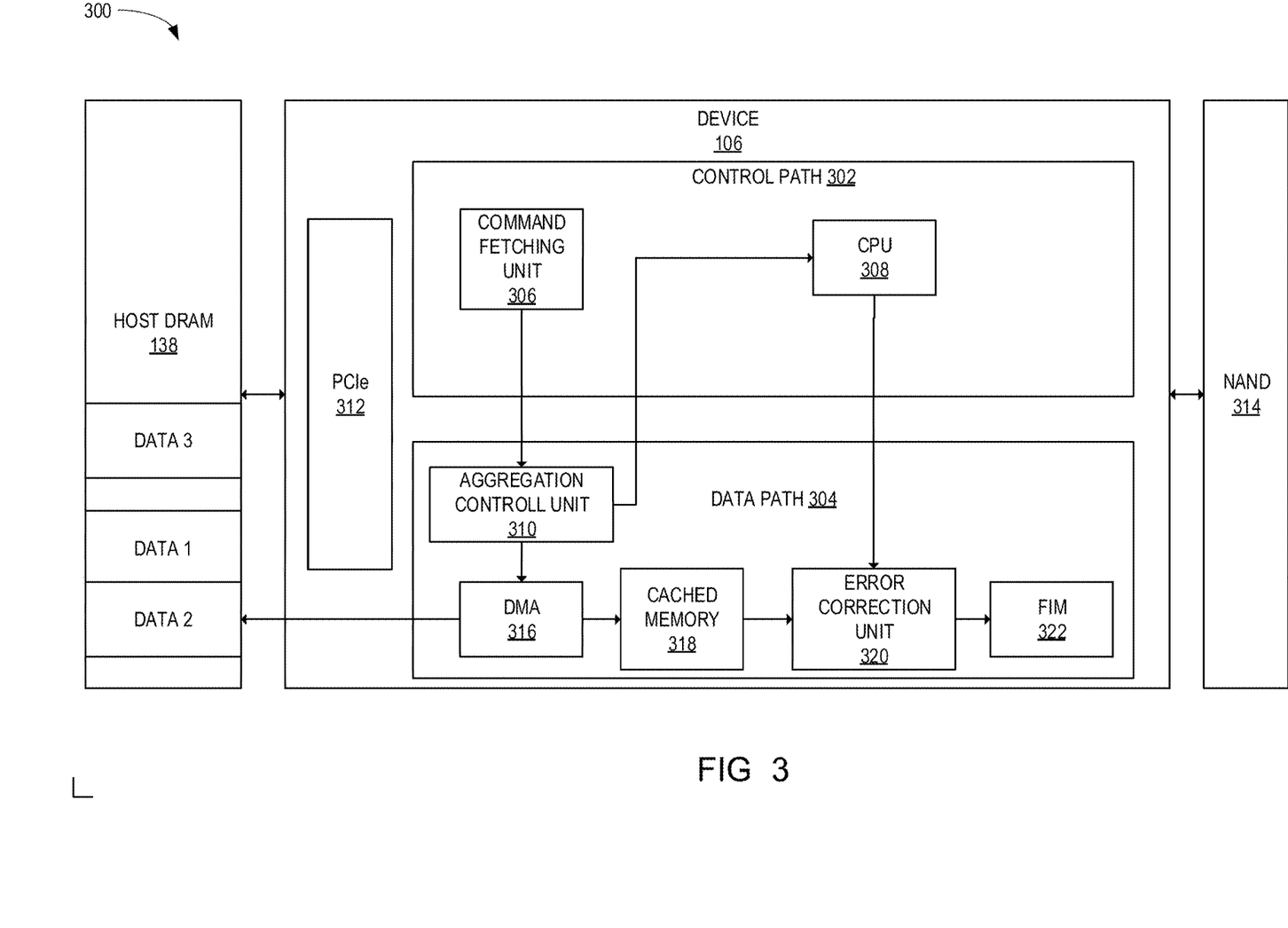
FIG. 3 is a schematic block diagram illustrating a storage system, in which a device has aggregation functionality, according to certain embodiments.

FIG. 3 is a schematic block diagram illustrating a storage system 300, in which a device has aggregation functionality, according to certain embodiments. The storage system 300 comprises a device such as the data storage device 106 of FIG. 1, a host DRAM such as the host DRAM 138 of FIG. 1, and a NAND 314. The host DRAM 138 comprises data 1, data 2, and data 3. Though only three units of data are shown in this example, there can be more or less units. The device 106 is responsible for transferring data (data 1, data 2, and data 3) from the host DRAM 138 to the NAND 314. The device 106 contains a PCIe bus 312, a control path 302, and a data path 304. The data path 304 is typically done by hardware (HW) to meet the high performance requirement, while the control path is done by firmware (FW) to allow flexibility. The control path 302 contains a command fetching unit 306 and a CPU 308, which controls the data path 304.

The data path 304 comprises an aggregation control unit 310, a direct memory access (DMA) module 316, a cached memory 318, an error correction unit 320, and a flash interface module (FIM) 322. The aggregation control unit 310 is responsible for collecting data into a programmable block size. The DMA 316 is responsible for actual data transfer while the cached memory 318 holds all of the accumulated data. The error correction unit 320 is used to allow for better data recovery when a read operation is performed, and is an optional unit. The FIM 322 is responsible for transferring the data to the NAND 314 and to trigger the program operation or programmable granularity as mentioned previously. The aggregation log of the aggregation control unit 310 is discussed below.

Figure 4:
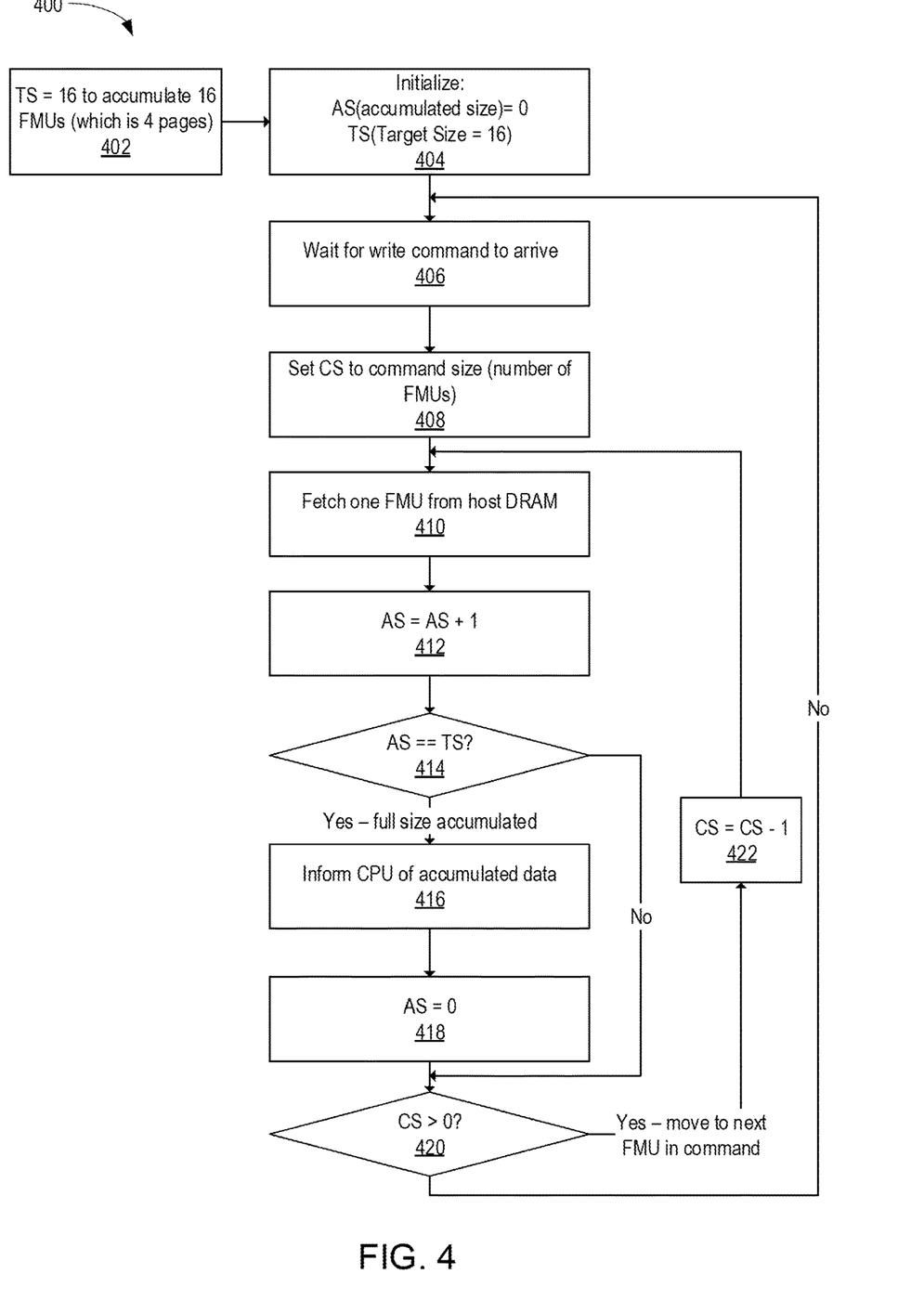
FIG. 4 is a flowchart illustrating a method for aggregation logic, according to certain embodiments.

FIG. 4 is a flowchart illustrating a method 400 for aggregation logic, according to certain embodiments. Once commands arrive, the aggregation controller such as the aggregation control unit 310 in FIG. 3 fetches one flash memory unit (FMU) at a time from the commands. Whenever enough data is fetched for a single program operation, the CPU, such as the CPU 308 of FIG. 3, triggers the error correction and FIM, such as FIM 322 of FIG. 3. The controller, such as the controller 108 of FIG. 1, will continue to handle more FMUs of the same, or different commands.

The method 400 begins at block 402. At block 402, the controller recognizes that the target size (TS) is equal to 16 FMUs which will be 4 pages in this example. At block 404, the controller will initialize an accumulated size (AS) which will be 0 and the TS which will be 16 as mentioned previously. At block 406, the controller waits for at least one write command to arrive. At block 408, the controller sets the command size (CS) (number of FMUs). At block 410, the controller fetches at least one FMU from the host DRAM, such as the host DRAM 138 of FIG. 1. At block 412, the controller increases AS by the formula AS is equal to AS plus 1. At block 414, the controller determines whether AS is equal to TS. If the controller determines that AS is not equal to TS, then the method 400 proceeds to block 420. If the controller determines that AS is equal to TS and a full size is accumulated, then the method 400 proceeds to block 416. At block 416, the controller informs the CPU of accumulated data. At block 418, the controller sets AS equal to 0. At block 420, the controller determines if CS is greater than 0. If the controller determines that CS is not greater than 0 then the method 400 returns to block 406. If the controller determines that CS is greater than 0 then the controller can move to the next FMU in the command and the method 400 proceeds to block 422. At block 422, the controller sets CS is equal to CS minus 1. At the completion of block 422 the method 400 returns to block 410. An issue with method 400 is seen when a programmable block has at least one bad page.

Figure 5:
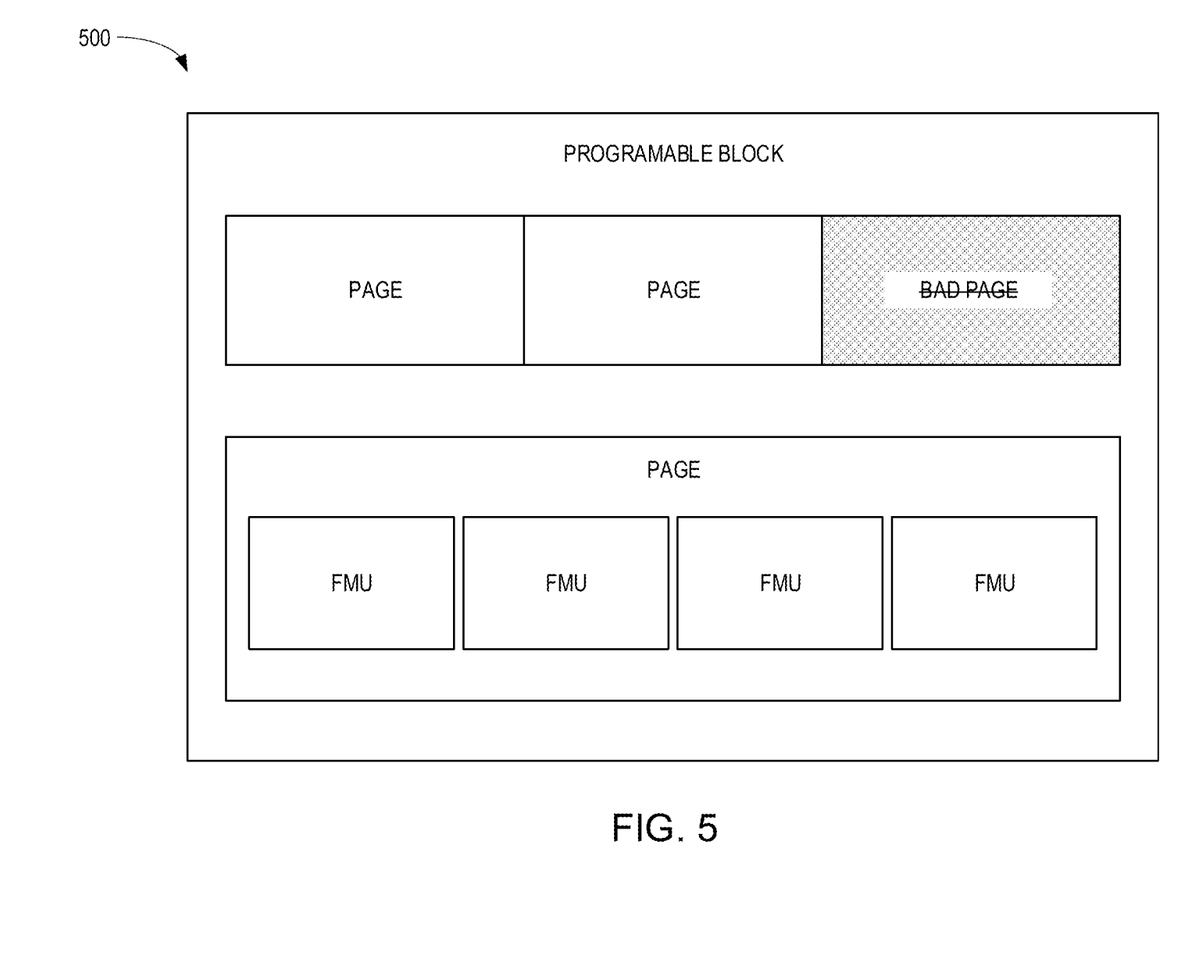
FIG. 5 is a schematic diagram illustrating a programmable block with a worn page, according to certain embodiments.

FIG. 5 is a schematic diagram illustrating a programmable block 500 with a worn page, according to certain embodiments. In this example, the CPU/FW, such as CPU 308, cannot use the aggregated size. The aggregated size is an issue due to a page in the programmable block being worn (bad page). The controller, such as the controller 108, will need to break the block aggregation into page aggregation and reconstruct based on the bad-block size. The reconstruction process leaves one page "floating". When the next block arrives from the aggregation unit, such as aggregation control unit 310 of FIG. 3, will need to merge the floating page with the new programmable block. This approach will then leave the next new programmable block with a floating page. Over time, multiple floating pages will get accumulated to fill a programmable block and will be written to the NAND, such as the NAND 314 of FIG. 3. Furthermore, the approach introduces FW complexity, and the overhead involved in the breaking and reconstruction of the programmable blocks can cause performance degradation. Previously, to solve these issues, accumulation is done in the page rather than the entire programmable block. Though that approach works, the approach leads to the problem of needing to merge pages into blocks. While merging pages is easier than breaking and reconstructing, FW overhead is added even on NANDs such as the full functioning NAND 200 of FIG. 2 where there are no bad pages.

Figure 6:
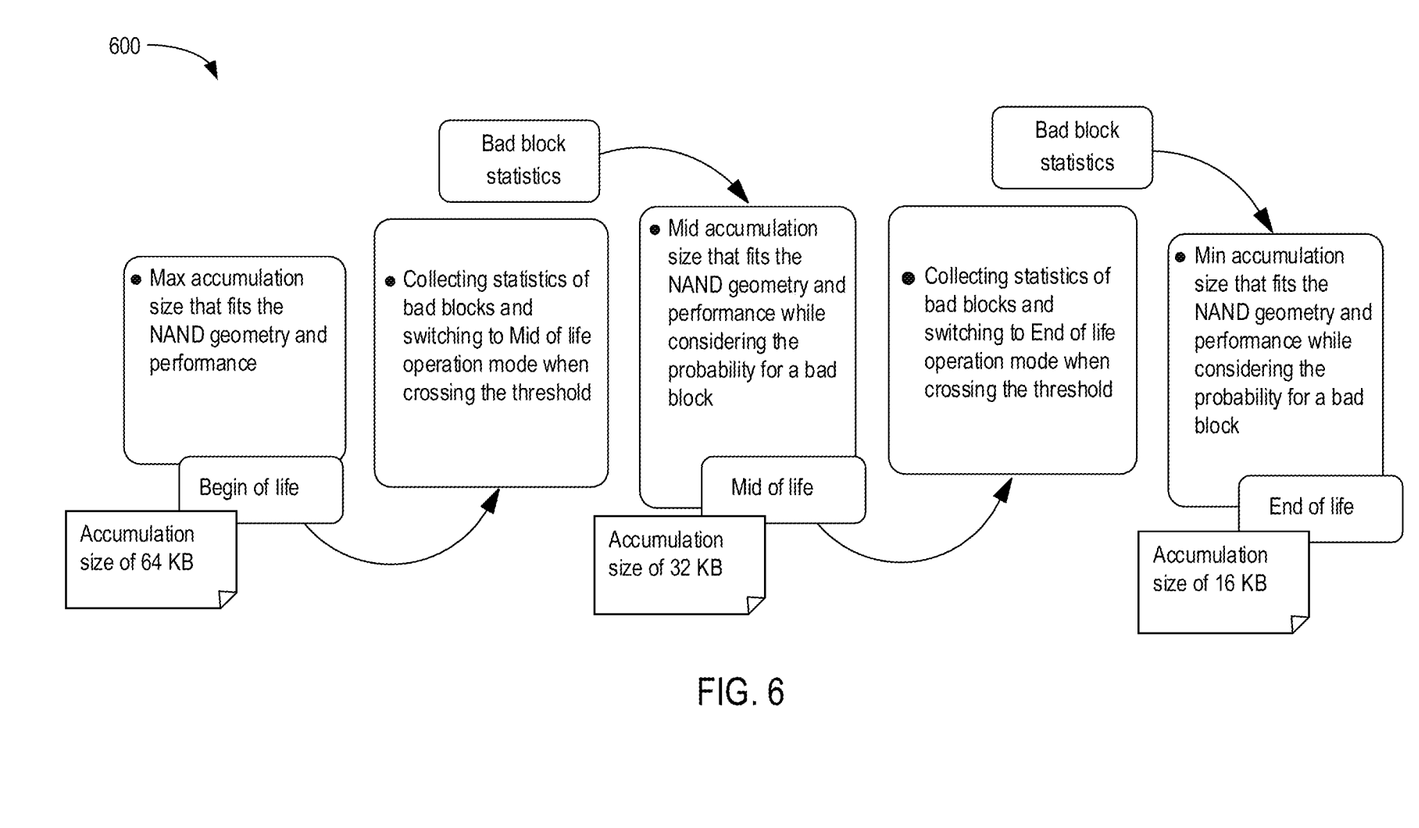
FIG. 6 is a flowchart illustrating a method for accumulation size throughout a life cycle, according to certain embodiments.

FIG. 6 is a flowchart illustrating a method 600 for accumulation size throughout a life cycle, according to certain embodiments. At the beginning of the NAND life, the device accumulates data based on the NAND geometry (64 KB for programmable block example). Later due to bad-block statistic collection there is a switch to a lower accumulation size (i.e. 32 KB), which is held during the mid life. The collecting statistic accumulation size might drop (as low as 16 k) as the programmable block moves towards the end of life of the NAND. When collecting statics of bad blocks and switching from beginning of life to mid life, the programmable block may cross a threshold. The threshold maybe based on the accumulation size of bad block collected.

Figure 7:
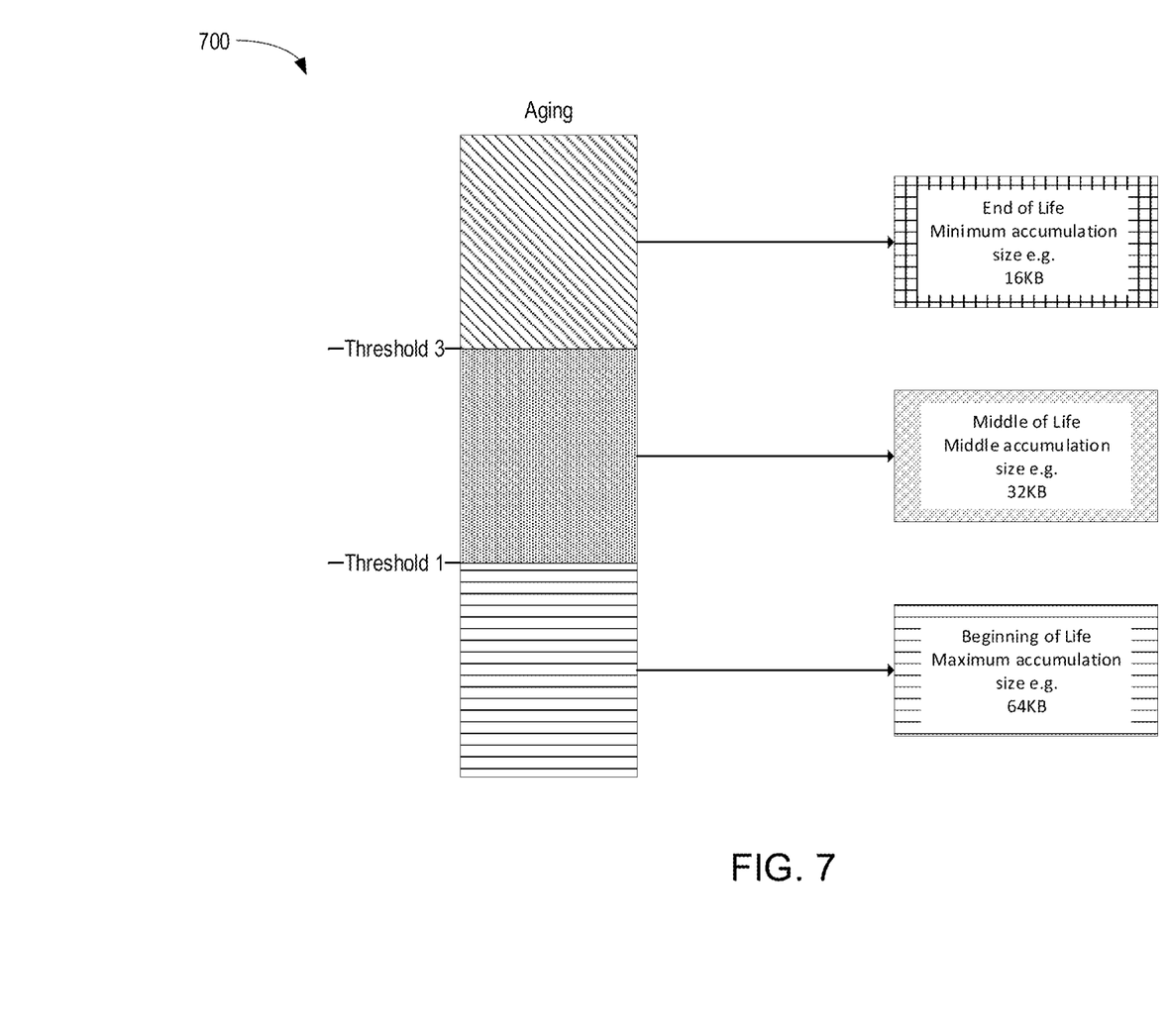
FIG. 7 is a schematic diagram illustrating life cycle thresholds, according to certain embodiments.

FIG. 7 is a schematic diagram illustrating life cycle thresholds 700, according to certain embodiments. The controller, such as the controller 108 of FIG. 1, will accumulate different sizes based on the age of the NAND. The age of the NAND is measured by the bad block statistics. The three levels (and two threshold) are just an example, there may be more or less levels and thresholds. In different embodiments, a switch can be made from 64K directly to 16K, or from 64K to 48K, to 32, and to 16K (any multiplication of page-size starting from block size). The switching is made because the number of valid pages changes over time and therefore, adjustments are made based on the changing number of valid pages.

In this embodiment the life cycle threshold 700 has a threshold 1 and a threshold 3. For this example there are three different aging levels, but could be more or less. The three levels are Beginning of Life, Middle of Life, and End of Life. At the Beginning of Life the maximum accumulation size is 64 KB. For the Middle of Life the middle accumulation size is 32 KB. At the End of Life the minimum accumulation size is 16 KB. FIG. 7 shows that the accumulation size can be dynamic over the device lifetime.

Figure 8:
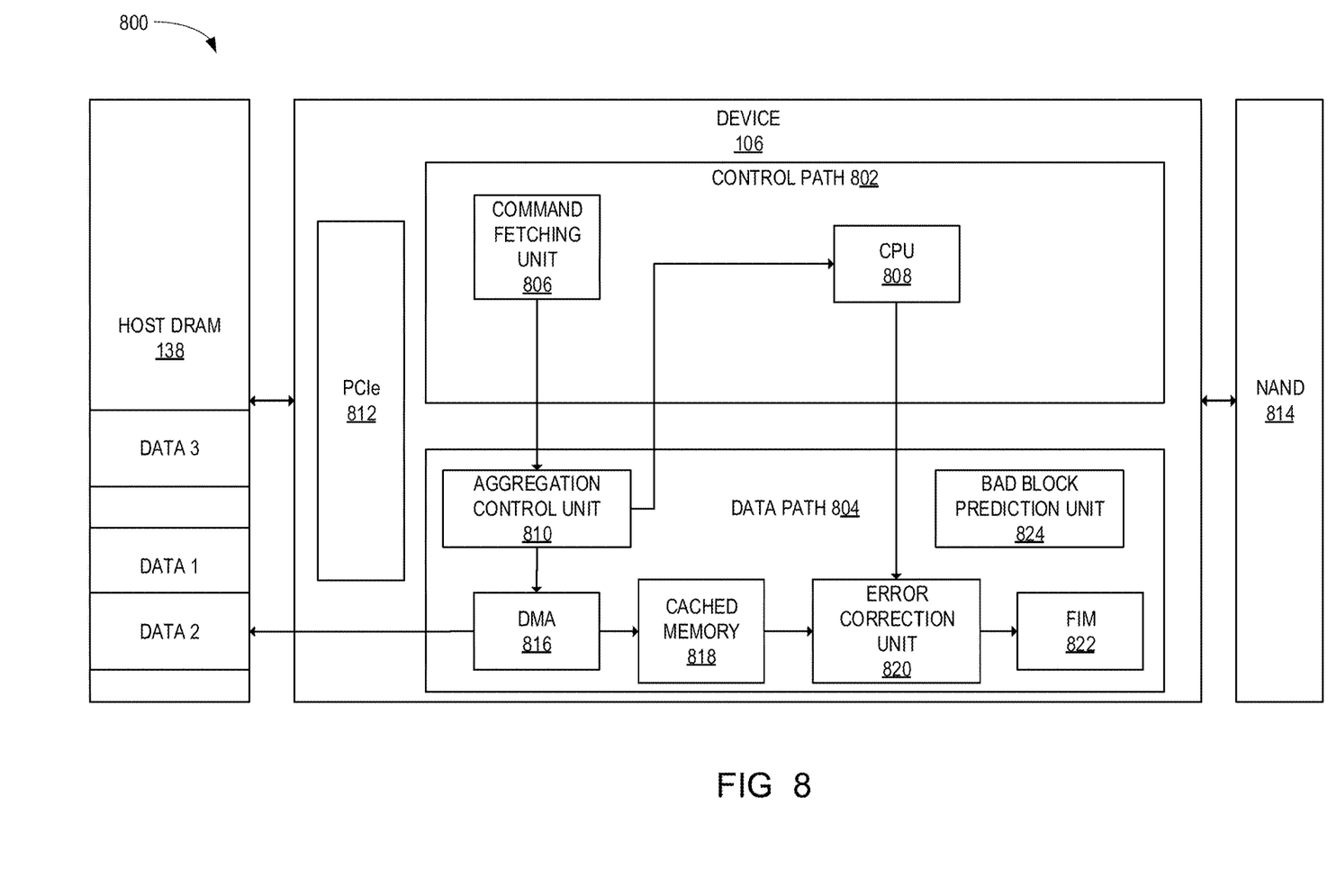
FIG. 8 is a schematic diagram illustrating a storage system in which a device has bad block prediction functionality, according to certain embodiments.

FIG. 8 is a schematic diagram illustrating a storage system 800 in which a device has bad block prediction functionality, according to certain embodiments. The storage system 800 comprises a device, such as the data storage device 106 of FIG. 1, a host DRAM, such as the host DRAM 138 of FIG. 1, and a NAND 814. The host DRAM 138 comprises data 1, data 2, and data 3. Though only three units of data are shown in this example, there can be more or less units. The device 106 is responsible for transferring data (data 1, data 2, and data 3) from the host DRAM 138 to the NAND 814. The device 106 contains a PCIe bus 812, a control path 802, and a data path 804. The control path 802 contains a command fetching unit 806 and a CPU 808, which controls the data path 804.

The data path 804 comprises an aggregation control unit 810, a DMA 816, a cached memory 818, an error correction unit 820, a FIM 822, and a bad block prediction unit 824. The aggregation control unit 810 is responsible for collecting data into a programmable block size. The bad block prediction unit 824 tracks the number "reconstructions" due to bad-blocks made by the CPU 808. The bad block prediction unit 824 predicts when the best time will be to switch into page-aggregation rather than block-aggregation.

Figure 9:
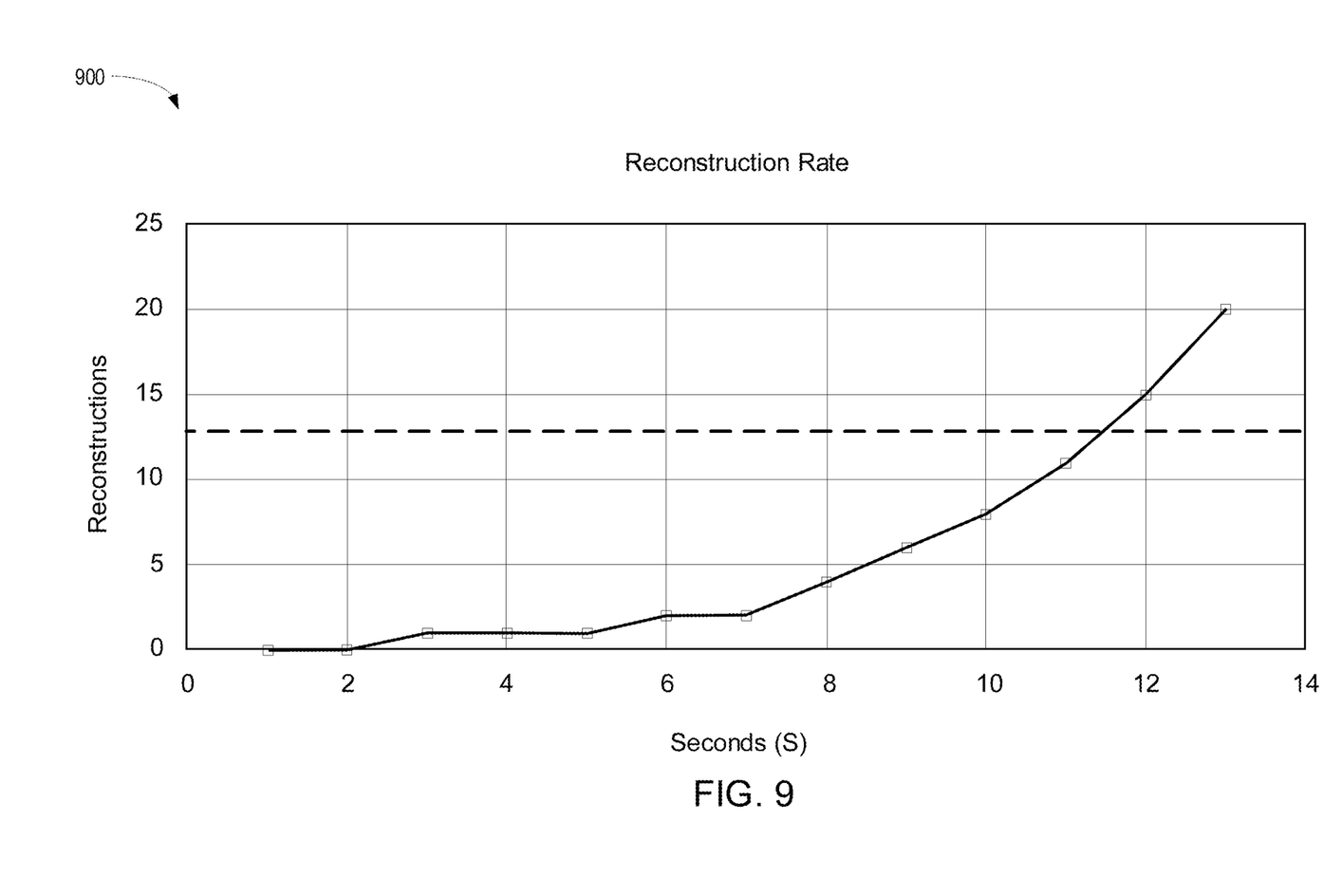
FIG. 9 is a graph illustrating a bad block tracker, according to certain embodiments.

FIG. 9 is a graph illustrating a bad block tracker example 900, according to certain embodiments. The x-axis is seconds, while the y-axis is number of reconstructions. The horizontal dashed line present (at 13) in this example is used to indicate the number of reconstructions per second which is more efficient to aggregate at a threshold, for example threshold 1, of FIG. 7. The solid curved line shows the number of reconstructions at each second. In this example, at second 11, the bad block prediction unit 824 of FIG. 8 predicts that in the next second, the dash line boundary (at 13) will be crossed. At this point, the controller, such as the controller 108 of FIG. 1, will update the target size (TS) value to a lower value, i.e. 4 (instead of 16). Furthermore, the aggregation control unit 810 of FIG. 8 will start to accumulate page size data, instead of block size data. In other embodiments, this logic may be applied on a per NAND basis.

Figure 10:
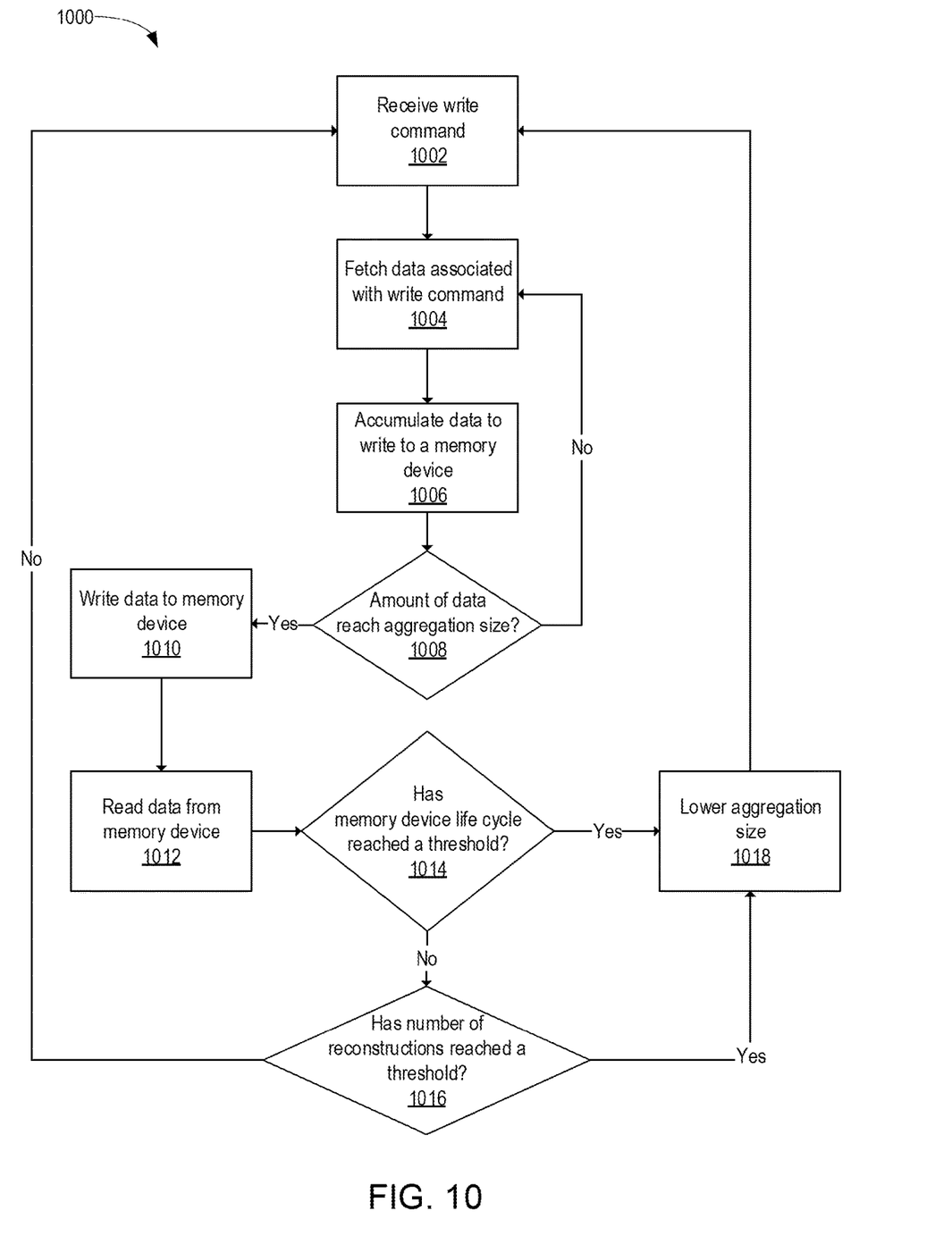
FIG. 10 is a flowchart illustrating a method for decreasing aggregation size, according to certain embodiments.

FIG. 10 is a flowchart illustrating a method 1000 for decreasing aggregation size, according to certain embodiments. It is to be understood that the controller is preset to determine if the aggregation size will be lowered based on either the number of reconstructions or the life cycle of the memory device reaching a threshold. Furthermore, the controller can decide to check the life cycle of the memory device before checking if the number of reconstructions has reached a page boundary. Furthermore, in the method 1000, block 1016 can be completed before block 1014. When the controller receives a write command at block 1002, the bad block prediction unit 824 will decide whether life cycle prediction or reconstruction prediction will be best for the performance of the programmable device once data is read from the memory device at block 1012.

The method 1000 begins at block 1002. At block 1002, the controller, such as controller 108 of FIG. 1, receives a write command. At block 1004, the controller fetches data associated with the write command. At block 1006, the controller accumulates data to write to a memory device. At block 1008, the bad block prediction unit 824 of FIG. 8 determines whether the amount of data has reached aggregation size. If the bad block prediction unit 824 determines that the amount of data has not reached aggregation size, then the method returns to block 1004. If the bad block prediction unit 824 determines that the amount of data has reached aggregation size, then the method proceeds to block 1010. At block 1010, the controller writes the data to the memory device. At block 1012, the controller reads the data from the memory device. At block 1014, the bad block prediction unit 824 determines whether the life cycle of the memory device has reached a threshold. If the bad block prediction unit 824 determines that the life cycle of the memory device has reached a threshold, then the method proceeds to block 1018. If the bad block prediction unit 824 determines that the life cycle of the memory device has not reached the threshold, then the method proceeds to block 1016. At block 1016, the bad block prediction unit 824 determines whether a number of reconstructions has reached a threshold. If the bad block prediction unit 824 determines that the number of reconstructions has not reached a threshold, then the method returns to block 1002. If the bad block prediction unit 824 determines that the number of reconstructions has reached a threshold then the method 1000 proceeds to block 1018. At block 1018, the bad block prediction unit 824 lowers the aggregation size.

Aggregating block size data is better for performance when the NAND has little number of bad blocks. Aggregating page sized data is better for performance when the NAND is worn out and contains many bad blocks. Switching, and predicting when to switch, from block-sized aggregation to page-sized aggregation is advantageous. The bad blocks are discovered during a read operation. Tracking the number of bad blocks and then changing the number of FMUs aggregated before writing to the memory device (e.g., NAND) is valuable, and could be done on a per NAND basis or per device basis. The main advantage of this new approach is that the best aggregation size is based on the NAND wear level. Hence, the device does not need to prepare for the worst-case scenario, while in the worst-case scenario. In turn the device can have a more optimized behavior on the good case saving performance and power before we reach a bad case.

In one embodiment, a data storage device comprises: a memory device; and a controller coupled to the memory device, wherein the controller is configured to: aggregate first data for writing the first data to the memory device, wherein the aggregating first data is for a first aggregation size; change the first aggregation size to a second aggregation size, wherein the first aggregation size is different than the second aggregation size; and aggregate second data for writing the second data to the memory device, wherein the aggregating second data is for the second aggregation size. The changing is in response to a bad block determination. The changing is in response to the memory device exceeding a lifetime threshold. The memory device comprises at least one die and wherein the aggregating occurs independently for each die of the at least one die. The aggregating occurs uniformly for an entirety of the memory device. The controller is configured to track a number of reconstructions that occur due to bad blocks in the memory device. The controller is configured to fetch one flash memory unit (FMU) of data at a time from a host device. The controller is configured to accumulate fetched data until sufficient data is accumulated to write data to the memory device in a single program operation, and wherein the single program operation writes an amount of data equal to the first aggregation size. The first aggregation size is a block size aggregation and wherein the second aggregation size is a lower multiple of page, and down to a page size aggregation.

In another embodiment, a data storage device comprises: a memory device; and a controller coupled to the memory device, wherein the controller is configured to: aggregate first data for writing the first data to the memory device, wherein the aggregating first data is for a first aggregation size; track a lifetime of the memory device; dynamically change the first aggregation size to a second aggregation size based upon the tracked lifetime, wherein the first aggregation size is larger than the second aggregation size; and aggregate second data for writing the second data to the memory device, wherein the aggregating second data is for the second aggregation size. The dynamically changing occurs when the lifetime exceeds a predetermined threshold. The tracked lifetime correlates to an increase of bad blocks in the memory device. The increase of bad blocks is a predicted increase of bad blocks. The increase of bad blocks is a detected increase of bad blocks. The dynamically changing comprises decreasing the aggregation size by at least one page. The controller includes a bad block prediction module. The bad block prediction module is disposed in a data path of the controller and is coupled to a CPU that is disposed in a control path of the controller.

In another embodiment, a data storage device comprises: means for storing data; and a controller coupled to the means for storing data, wherein the controller is configured to: track a number of reconstructions that occur due to bad blocks in the means for storing data; predict when a number of reconstructions will exceed a predetermined threshold; and switch an aggregation size of data to be aggregated based upon the prediction. The reconstructions are in response to reading data from the means for storing data. The predetermined threshold correlates to a number of reconstructions per second above which switching the aggregation size is more efficient.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
aggregate first data for writing the first data to the memory device, wherein the aggregating first data is for a first aggregation size;
change the first aggregation size to a second aggregation size, wherein the first aggregation size is different than the second aggregation size, wherein the changing is in response to a bad block determination; and
aggregate second data for writing the second data to the memory device, wherein the aggregating second data is for the second aggregation size.

2. The data storage device of claim 1, wherein the controller is configured to fetch one flash memory unit (FMU) of data at a time from a host device.

3. The data storage device of claim 2, wherein the controller is configured to accumulate fetched data until sufficient data is accumulated to write data to the memory device in a single program operation, and wherein the single program operation writes an amount of data equal to the first aggregation size.

4. The data storage device of claim 1, wherein the controller is configured to predict when to perform the changing.

5. A data storage device, comprising:
a memory device; and
a controller coupled to the memory device, wherein the controller is configured to:
aggregate first data for writing the first data to the memory device, wherein the aggregating first data is for a first aggregation size;
change the first aggregation size to a second aggregation size, wherein the first aggregation size is different than the second aggregation size, wherein the changing is in response to the memory device exceeding a lifetime threshold; and
aggregate second data for writing the second data to the memory device, wherein the aggregating second data is for the second aggregation size.

6. A data storage device, comprising:
a memory device; and
a controller coupled to the memory device, wherein the controller is configured to:
aggregate first data for writing the first data to the memory device, wherein the aggregating first data is for a first aggregation size;
change the first aggregation size to a second aggregation size, wherein the first aggregation size is different than the second aggregation size; and
aggregate second data for writing the second data to the memory device, wherein the aggregating second data is for the second aggregation size, wherein the memory device comprises at least one die and wherein the aggregating occurs independently for each die of the at least one die.

7. A data storage device, comprising:
a memory device; and
a controller coupled to the memory device, wherein the controller is configured to:
aggregate first data for writing the first data to the memory device, wherein the aggregating first data is for a first aggregation size;
change the first aggregation size to a second aggregation size, wherein the first aggregation size is different than the second aggregation size; and
aggregate second data for writing the second data to the memory device, wherein the aggregating second data is for the second aggregation size, wherein the aggregating occurs uniformly for an entirety of the memory device.

8. A data storage device, comprising:
a memory device; and
a controller coupled to the memory device, wherein the controller is configured to:
aggregate first data for writing the first data to the memory device, wherein the aggregating first data is for a first aggregation size;
change the first aggregation size to a second aggregation size, wherein the first aggregation size is different than the second aggregation size; and
aggregate second data for writing the second data to the memory device, wherein the aggregating second data is for the second aggregation size, wherein the controller is configured to track a number of reconstructions that occur due to bad blocks in the memory device.

9. A data storage device, comprising:
a memory device; and
a controller coupled to the memory device, wherein the controller is configured to:
aggregate first data for writing the first data to the memory device, wherein the aggregating first data is for a first aggregation size;
change the first aggregation size to a second aggregation size, wherein the first aggregation size is different than the second aggregation size; and
aggregate second data for writing the second data to the memory device, wherein the aggregating second data is for the second aggregation size, wherein the first aggregation size is a block size aggregation and wherein the second aggregation size is a lower multiple of page, and down to a page size aggregation.

10. A data storage device, comprising:
a memory device; and
a controller coupled to the memory device, wherein the controller is configured to:

aggregate first data for writing the first data to the memory device, wherein the aggregating first data is for a first aggregation size;

track a lifetime of the memory device;

dynamically change the first aggregation size to a second aggregation size based upon the tracked lifetime, wherein the first aggregation size is larger than the second aggregation size; and aggregate second data for writing the second data to the memory device, wherein the aggregating second data is for the second aggregation size.

11. The data storage device of claim 10, wherein the dynamically changing occurs when the lifetime exceeds a predetermined threshold.

12. The data storage device of claim 11, wherein the tracked lifetime correlates to an increase of bad blocks in the memory device.

13. The data storage device of claim 12, wherein the increase of bad blocks is a predicted increase of bad blocks.

14. The data storage device of claim 12, wherein the increase of bad blocks is a detected increase of bad blocks.

15. The data storage device of claim 10, wherein the dynamically changing comprises decreasing the aggregation size by at least one page.

16. The data storage device of claim 10, wherein the controller includes a bad block prediction module.

17. The data storage device of claim 16, wherein the bad block prediction module is disposed in a data path of the controller and is coupled to a CPU that is disposed in a control path of the controller.

18. A data storage device, comprising:

means for storing data; and a controller coupled to the means for storing data, wherein the controller is configured to:

track a number of reconstructions that occur due to bad blocks in the means for storing data;

predict when a number of reconstructions will exceed a predetermined threshold; and switch an aggregation size of data to be aggregated based upon the prediction.

19. The data storage device of claim 18, wherein the reconstructions are in response to reading data from the means for storing data.

20. The data storage device of claim 18, wherein the predetermined threshold correlates to a number of reconstructions per second above which switching the aggregation size is more efficient.

* * * * *